(12) United States Patent
Choi et al.

(10) Patent No.: US 8,319,729 B2
(45) Date of Patent: Nov. 27, 2012

(54) DISPLAY DEVICE

(75) Inventors: Jong Seong Choi, Anyang-si (KR); Hyung Uk Jang, Seongnam-si (KR); Sang Rae Lee, Gyeongju-si (KR); Sang Hyuck Bae, Seoul (KR); Byung Chun Yu, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 773 days.

(21) Appl. No.: 12/335,364

(22) Filed: Dec. 15, 2008

(65) Prior Publication Data

US 2009/0267889 A1 Oct. 29, 2009

(30) Foreign Application Priority Data

Apr. 23, 2008 (KR) .................. 10-2008-0037947

(51) Int. Cl.
*G06F 3/033* (2006.01)
(52) U.S. Cl. ......... 345/158; 345/173; 345/175; 345/111
(58) Field of Classification Search .................. 345/173, 345/158, 175, 102, 111, 161; 349/58; 361/679.43; 348/374; 455/75.1
See application file for complete search history.

(56) References Cited

U.S. PATENT DOCUMENTS

| 5,923,319 | A | 7/1999 | Bishop et al. |
| 6,519,144 | B1* | 2/2003 | Henrie et al. ............ 361/679.43 |
| 6,727,954 | B1* | 4/2004 | Okada et al. .................. 348/374 |
| 6,771,992 | B1* | 8/2004 | Tomura et al. ............. 455/575.1 |
| 2004/0041960 | A1* | 3/2004 | Hwang .......................... 349/58 |
| 2004/0189887 | A1* | 9/2004 | You et al. ...................... 349/58 |
| 2005/0073506 | A1* | 4/2005 | Durso .......................... 345/173 |
| 2008/0246901 | A1* | 10/2008 | Park .............................. 349/58 |

FOREIGN PATENT DOCUMENTS

JP 2003-162375 A 6/2003
* cited by examiner

*Primary Examiner* — Thuy Pardo
(74) *Attorney, Agent, or Firm* — Birch, Stewart, Kolasch & Birch, LLP

(57) ABSTRACT

A display device capable of simplifying the structure and improving the reliability is disclosed. The display device includes an LCD module having a top case formed of metal, a glass substrate arranged on the LCD module, an infrared ray emitting module arranged to face three side surfaces of the LCD module and having a first magnet for first fixing to the top case, and a pair of infrared ray detection units arranged at corner ends of a side surface of the LCD module where the infrared ray emitting module is not arranged and having a second magnet for the first fixing to the top case.

14 Claims, 5 Drawing Sheets

DISPLAY DEVICE

CROSS-REFERENCE TO RELATED APPLICATION

This application claims priority under 35 U.S.C. 119 to Korean Patent Application No. 10-2008-0037947, filed on Apr. 23, 2008, which is hereby incorporated by reference in its entirety.

BACKGROUND

1. Field of the Disclosure

This disclosure relates to a display device which has a simplified structure and can improve reliability.

2. Description of the Related Art

Recently, a variety of flat panel display devices with reduced weight and volume have been widely used instead of cathode ray tube (CRTs). The flat panel display devices include liquid crystal display (LCD) devices, field emission display (FED) devices, plasma display panels (PDPs), and light emitting diode (LED) display devices.

These display devices display text and graphics input using a variety of input devices such as a keyboard, a mouse, or a digitizer. In particular, the digitizer is a device detecting the position of a finger or a pen on a specially manufactured flat panel and outputting the position as an X-Y coordinate. The digitizer is advantageous in that writing and/or drawing can be more easily and precisely input compared to the mouse or keyboard. A touch screen panel, as one of the digitizer, is commonly used by being attached to mid- and small-sized LCDs.

The touch screen panel is attached to an LCD by using a jig for attachment. A general attachment jig does not firmly support side surfaces of not only the LCD but also the touch screen panel so that a touch screen panel attachment defect such as a twist defect between the LCD and the touch screen panel may be generated. The touch screen panel defect is more frequently generated as the size of the LCD increases.

BRIEF SUMMARY

Accordingly, the present embodiments are directed to a display device that substantially obviates one or more of problems due to the limitations and disadvantages of the related art.

An object of the embodiment of the present disclosure is to provide a display device which can not only simplify the structure but also improve reliability.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a display device comprises an LCD module having a top case formed of metal, an infrared ray emitting module disposed to face three side surfaces of the LCD module and having a first magnet for firstly fixing to the top case, and a pair of infrared ray detection units arranged at corner ends of a side surface of the LCD module and having a second magnet for the first fixing to the top case.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
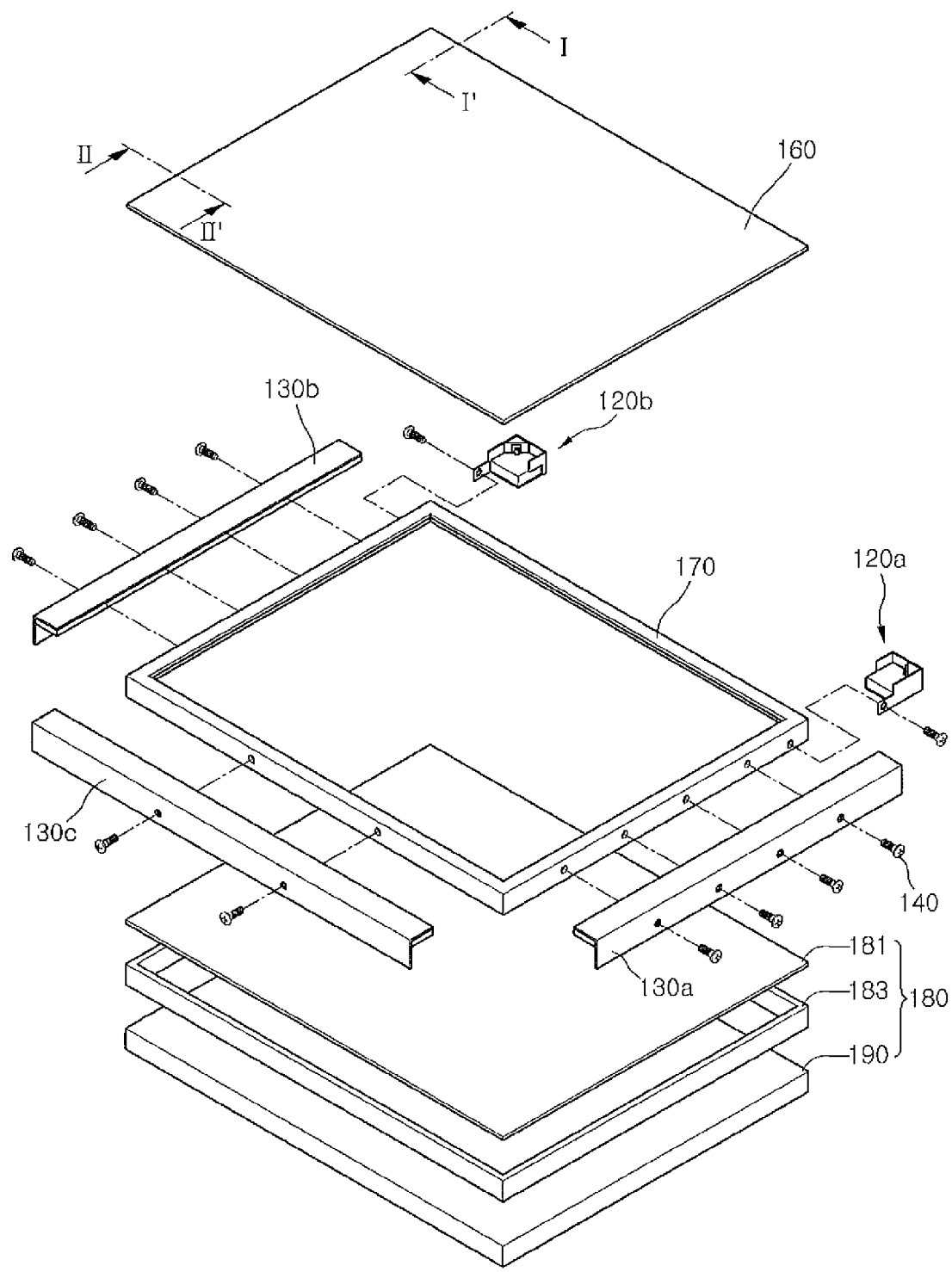
FIG. 1 is an exploded perspective view of a display device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
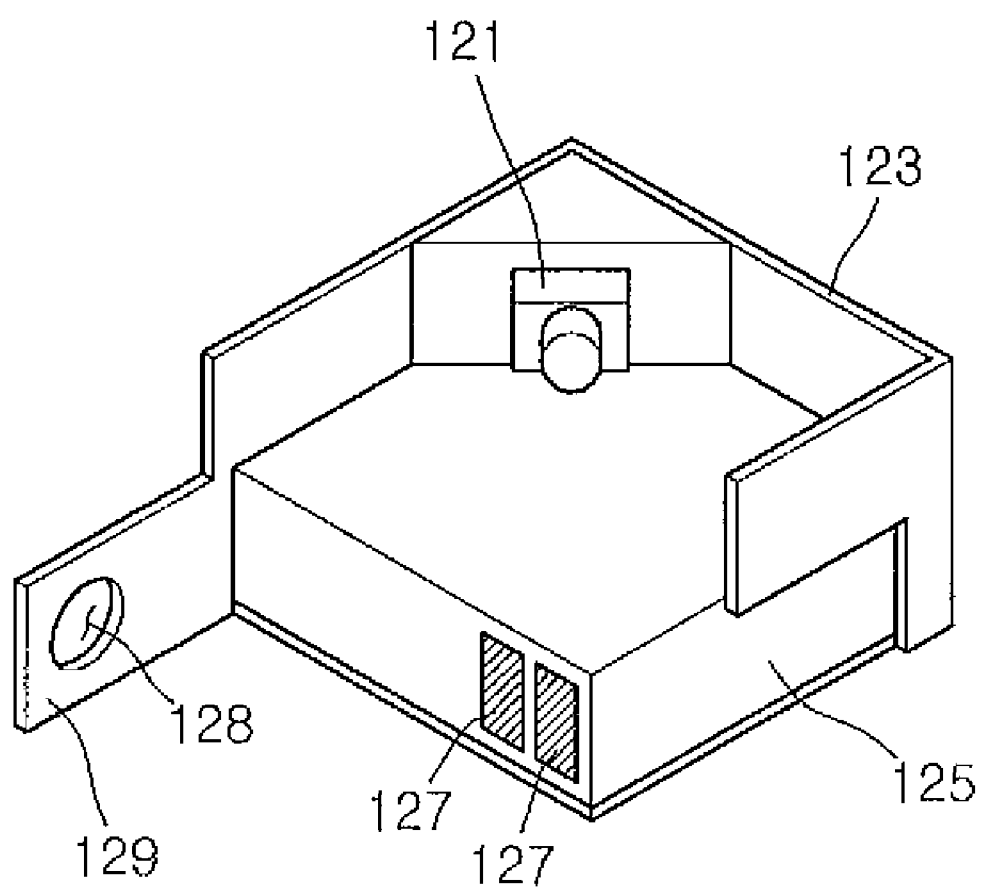
FIG. 2 is a perspective view of an infrared ray detecting unit according to an embodiment of the present disclosure.
Figure 3:
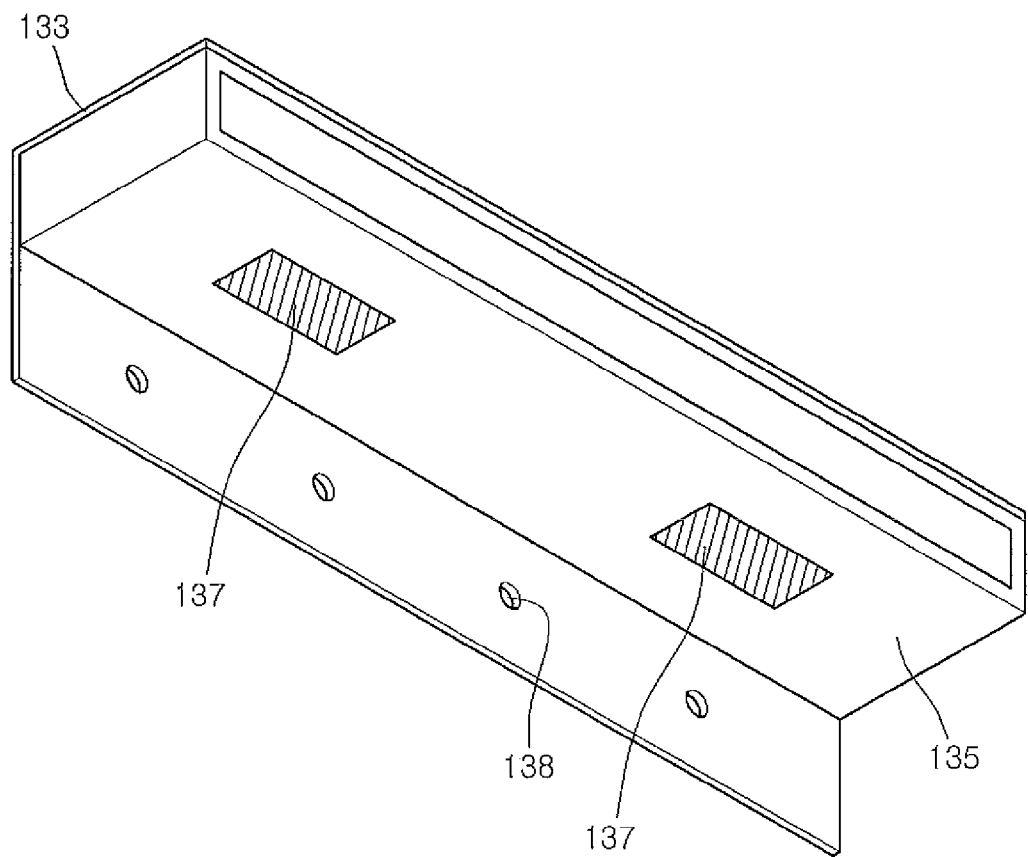
FIG. 3 is a perspective view of an infrared ray emitting module according to an embodiment of the present disclosure.
Figure 4:
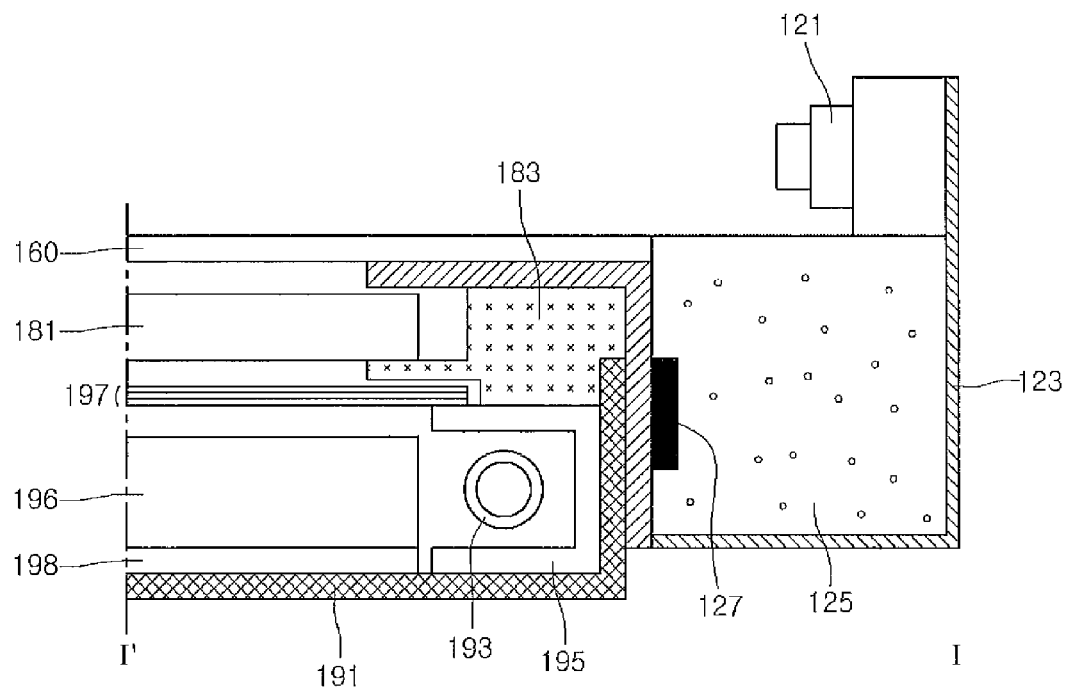
FIG. 4 is a cross-sectional view of the display device, taken along line I-I' of FIG. 1.
Figure 5:
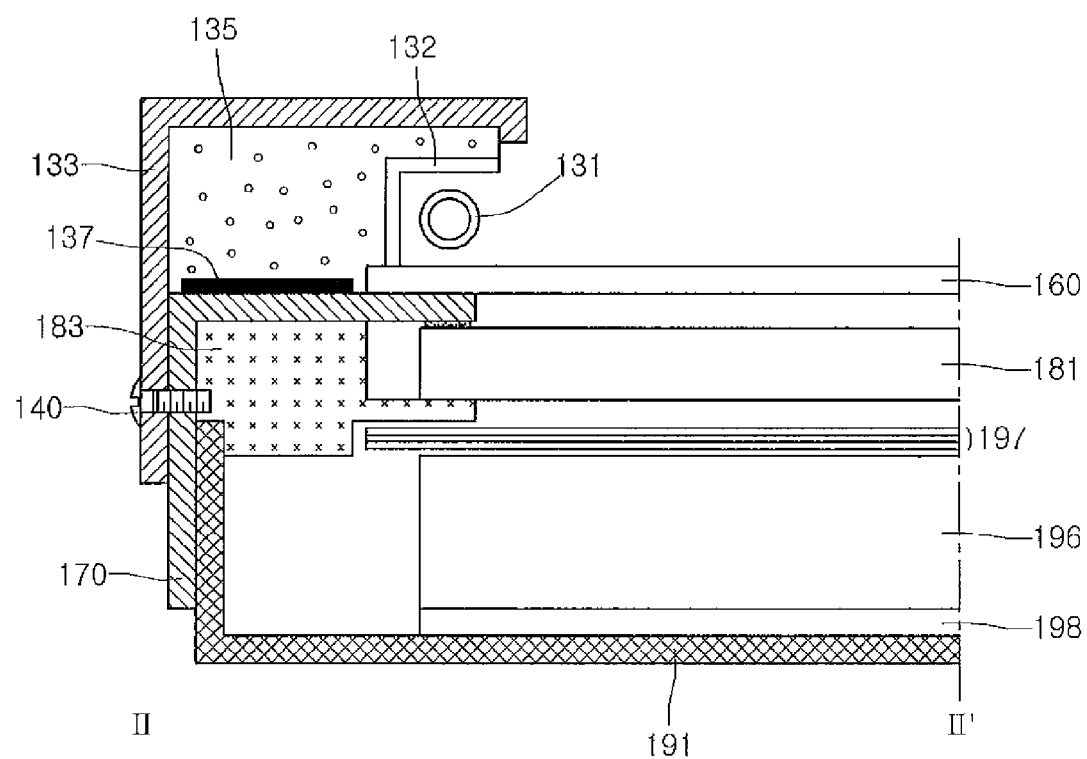
FIG. 5 is a cross-sectional view of the display device, taken along line II-II' of FIG. 1.

FIG. 1 is an exploded perspective view of a display device according to an embodiment of the present disclosure. FIG. 2 is a perspective view of an infrared ray detecting unit according to an embodiment of the present disclosure. FIG. 3 is a perspective view of an infrared ray emitting module according to an embodiment of the present disclosure. FIG. 4 is a cross-sectional view of the display device, taken along line I-I' of FIG. 1. FIG. 5 is a cross-sectional view of the display device, taken along line II-II' of FIG. 1.

Referring to FIGS. 1-5, a display device according to an embodiment of the present disclosure includes an LCD module 180 displaying an image, a plurality of infrared ray emitting modules 130a, 130b, and 130c arranged on the LCD module 180 and performing a digitizer function, and infrared detection units 120a and 120b.

In the display device of the present embodiment, a glass substrate 160 is arranged on the LCD module 180. The LCD module 180 includes an LCD panel 181 displaying an image, a backlight unit 190 arranged under the LCD panel 181 and providing light, and a panel guide 183 supporting the LCD panel 181. Also, the LCD module 180 further includes a top case 170 encompassing the edge of the LCD panel 181 and coupled to the backlight unit 190. The top case 170 is formed of metal and has a bending structure to encompass the edge of the LCD panel 181 and the panel guide 183.

The LCD panel 181 includes a thin film transistor (TFT) substrate (not shown) and a color filter substrate (not shown) which are combined to face each other and to maintain a uniform cell gap therebetween, and a liquid crystal layer (not shown) interposed between the TFT substrate and the color filter substrate.

The backlight unit 190 includes a bottom cover 191 having a box shape with an open upper surface, a light source 193 provided at a side surface of the bottom cover 191 and emitting light toward the LCD panel 181, a light source housing 195 encompassing the light source 193, and a light guide plate 196 disposed parallel to the light source 198 and converting the light from the light source 193 to a surface light Also, the backlight unit 190 further includes a reflection sheet 198 disposed on a lower surface of the light guide plate 196 to reflect light and a plurality of optical sheets 197 arranged on the light guide plate 196 to diffuse and concentrate light.

When the LCD module 180 having the above structure is completely assembled, the glass substrate 160, the infrared ray emitting modules 130a, 130b, and 130c, the infrared ray detection units 120a and 120b, and the LCD module 180 are assembled.

The infrared ray emitting modules 130a, 130b, and 130c are arranged at three side surfaces of the top case 170. Each of the infrared ray emitting modules 130a, 130b, and 130c includes an infrared ray emitting module cover 133 bent correspondingly to the side surface and the upper surface of the top case 170, an infrared ray lamp accommodation unit 135 arranged on an inner surface of the infrared ray emitting module cover 133, an infrared ray lamp 131 accommodated on the infrared ray lamp accommodation unit 135, and a plurality of first magnets 137 arranged on a lower surface of the infrared ray lamp accommodation unit 135 at a particular interval.

The infrared ray emitting module cover 133 faces the upper surface and the side surface of the top case 170 in a lengthwise direction. A plurality of first screw holes 138 are formed at the side surface of the infrared ray emitting module cover 133 that faces the side surface of the top case 170. A plurality of holes are formed at the side surface of the top case 170 to correspond to the first screw holes 138.

The first screw holes 138 are formed to fix the infrared ray emitting modules 130a, 130b, and 130c to the LCD module 180 and the number of the first screw holes 138 may be changed according to the size of a display device. A plurality of screws 140 are coupled to the holes of the top case 170 by penetrating the first screw holes 138.

The first magnets 137 that are arranged on the infrared ray lamp accommodation unit 135 facing the side surface of the top case 170 are provided to first fix the infrared ray emitting modules 130a, 130b, and 130c to the top case 170. Although it is not shown in the drawings, a plurality of indents (not shown) in which the first magnets 137 are inserted are formed in the infrared ray lamp accommodation unit 135.

According to the structure of the infrared ray emitting modules 130a, 130b, and 130c, since the first magnets 137 that are first fixed to the top case 170 are included, the assembly of the LCD module 180 and the infrared ray emitting modules 130a, 130b, and 130c can be improved. Also, when the secondarily fixing using the screws 140 is completed, a problem such as twist between the LCD module 180 and the infrared ray emitting modules 130a, 130b, and 130c can be prevented.

A pair of the infrared ray detection units 120a and 120b are provided at the corner areas of the top case 170 of the LCD module 180. That is, the infrared ray detection units 120a and 120b are arranged at both ends of one side surface of the top case 170 where the infrared ray emitting modules 130a, 130b, and 130c are not provided.

Each of the infrared ray detection units 120a and 120b includes an infrared ray camera 121 detecting an infrared ray emitted from the infrared ray lamp 131, a support unit 125 supporting the infrared ray camera 121, and an infrared ray detection unit cover 123 bent to encompass the edge of the support unit 125. A second screw hole 128 for coupling of the top case 170 is formed at a side surface 129 of the infrared ray detection unit cover 123.

Each of the infrared ray detection units 120a and 120b includes a plurality of second magnets 127 at a side surface of the support unit 125 facing the top case 170. That is, although it is not shown in the drawings, an indent (not shown) for accommodating each of the second magnets 127 is formed at the support unit 125.

The second magnets 127 firstly fixes the infrared ray detection units 120a and 120b at the corners of the side surface of the top case 170. When the infrared ray detection units 120a and 120b are firstly fixed to the top case 170 using the second magnets 127, the infrared ray detection units 120a and 120b are secondarily fixed to the top case 170 by using the screws 140.

The side surface 129 of each of the infrared ray detection units 120a and 120b where the second screw hole 128 is formed partially overlaps the infrared ray emitting modules 130a, 130b, and 130c. In detail, the display device according to the present embodiment may have a structure that a side of each of the infrared ray emitting modules 130a, 130b, and 130c corresponding to the side surface 129 of each of the infrared ray detection units 120a and 120b covers the side surface 129 of each of the infrared ray detection units 120a and 120b.

Thus, in the display device according to the present embodiment, since the infrared ray emitting modules 130a, 130b, and 130c are fixed after the infrared ray detection units 120a and 120b are fixed to the top case 170, the infrared ray detection units 120a and 120b can be more firmly fixed to the top case 170 by means of the infrared ray emitting modules 130a, 130b, and 130c having the overlapping areas with respect to the infrared ray detection units 120a and 120b.

Accordingly, in the display device according to the present embodiment, when a finger or a pen contacts the glass substrate 160, the infrared ray emitted from each of the infrared ray emitting modules 130a, 130b, and 130c is dispersed so that even a position, where the emitted infrared ray can be not detected, is recognized by means of the infrared ray detection units 120a and 120b as a touch position.

As described above, in the display device, according to the embodiment of the present disclosure, having the infrared ray emitting modules and the infrared ray detection units coupled to the LCD module, the LCD module, the infrared ray emitting modules, and the infrared ray detection units are more firmly coupled to one another by the first fixing using the first and second magnets and the second fixing using the screws. Thus, the deterioration of reliability due to the twist in the display device having a general digitizer function can be prevented.

Also, in the display device having a digitizer function, according to the present disclosure, since the hole for fixing using the screws is formed at the top case of the LCD module, a complicated design of the LCD module for representing the digitizer function is not needed. That is, a display device having a simplified structure can be embodied.

Furthermore, since the LCD module, the infrared ray emitting modules, and the infrared ray detection units can be easily assembled/disassembled, it is easy to replace any defect part when a defect is generated in any of the LCD module, the infrared ray emitting modules, and the infrared ray detection units.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A display device comprising:
a liquid crystal display (LCD) module having a top case formed of metal;
a plurality of infrared ray emitting modules arranged to face three outside surfaces of the LCD module,
wherein each of the plurality of infrared ray emitting modules has at least one magnet for affixing the module to the top case; and
a plurality of infrared ray detection units arranged at corner ends of outside surfaces of the LCD module,
wherein each of the plurality of infrared ray detection units has at least one magnet for affixing the module to the top case, and
wherein the plurality of infrared ray emitting modules and the plurality of infrared ray detection units have a digitizer function for detecting a physical and direct contact with the display device.

2. The display device of claim 1, wherein each of the plurality of infrared ray emitting modules comprises:
an infrared ray lamp configured to emit an infrared ray;
an infrared ray lamp accommodation unit for accommodating the infrared ray lamp within an infrared ray emitting module; and
an infrared ray emitting module cover configured to encompass the infrared ray lamp accommodation unit.

3. The display device of claim 2, wherein the at least one magnet of each of the plurality of infrared ray emitting modules is disposed at a side surface of the infrared ray lamp accommodation unit facing an outside surface of the top case.

4. The display device of claim 2, wherein the infrared ray emitting module cover is bent to overlap an upper surface of the top case.

5. The display device of claim 2, wherein each of the plurality of infrared ray emitting modules further comprises a plurality of screw holes that are formed at a side surface of the infrared ray emitting module cover to affix the corresponding infrared ray emitting module cover to an outside surface of the top case via a plurality of screws.

6. The display device of claim 2, wherein a side surface of the infrared ray emitting module cover and a side surface of an infrared ray detection unit cover overlap each other.

7. The display device of claim 2, wherein the infrared ray lamp accommodation unit has an indentation to insert the magnets.

8. The display device of claim 1, wherein each of the plurality of infrared ray detection units comprises:
an infrared ray camera configured to detect an infrared ray;
a support unit for supporting the infrared ray camera; and
an infrared ray detection unit cover bent to contact an edge of the support unit.

9. The display device of claim 8, wherein at least one magnet is disposed at a side surface of the support unit facing an outside surface of the top case.

10. The display device of claim 8, wherein a screw hole for coupling of the top case is formed at a side surface of the infrared ray detection unit cover.

11. The display device of claim 8, wherein a side surface of an infrared ray emitting module cover and a side surface of the infrared ray detection unit cover overlap each other.

12. The display device of claim 8, wherein the support unit has an indentation to insert the magnets.

13. The display device of claim 8, wherein the digitizer function comprises detecting a touch position on the display device using a dispersion of an infrared ray.

14. The display device of claim 1, wherein each of the infrared ray detection units is arranged, such that the corresponding infrared ray emitting module is completely enclosed within the display device.

* * * * *